(No Model.)
J. HOLTZ.
Obtaining Tannic Acid.
No. 231,489. Patented Aug. 24, 1880.
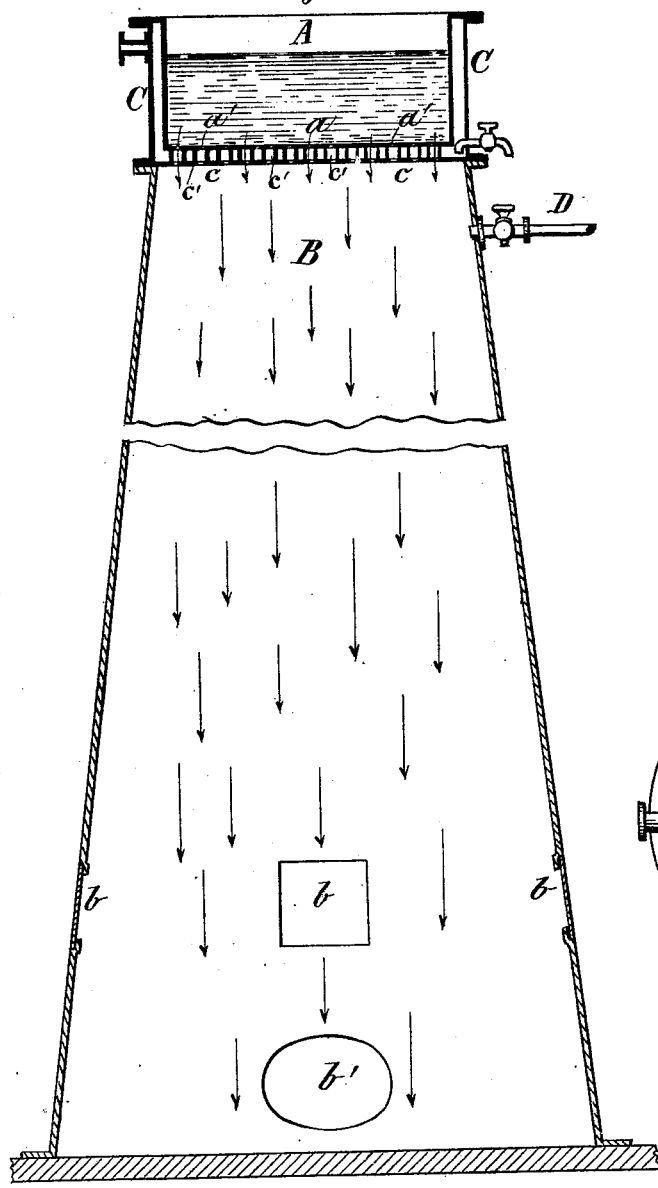
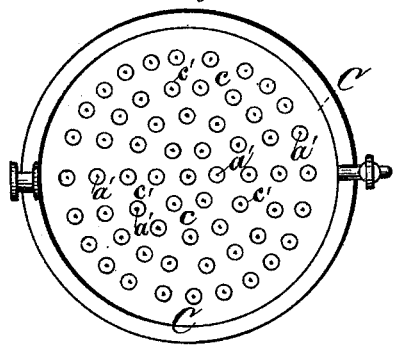
Witnesses
Alfred L. Leonard
Henri Guillaume
Inventor
Julius Holtz
Henry Orth atty.

UNITED STATES PATENT OFFICE.

JULIUS HOLTZ, OF BERLIN, PRUSSIA, GERMANY, ASSIGNOR TO CHEMISCHE FABRIK AUF ACTIEN, (VORM E. SCHERING,) OF SAME PLACE.

OBTAINING TANNIC ACID.

SPECIFICATION forming part of Letters Patent No. 231,489, dated August 24, 1880.

Application filed March 24, 1880. (No specimens.)

*To all whom it may concern:*

Be it known that I, JULIUS HOLTZ, resident of Berlin, in the Kingdom of Prussia, German Empire, have invented new and useful Improvements in Obtaining Tannic Acid in Acicular Crystals, of which the following is a specification.

My invention relates to improvements in the production or manufacture of tannic acid for use in the various branches of the arts and manufactures, and more particularly in the manufacture of leather.

The tannic acid employed for technical purposes has been heretofore prepared for market by drying the viscous products of extraction containing the tannin in a high temperature, and then grinding the dried product and placing it on the market in a pulverulent form. This method of preparing tannic acid has material disadvantage and defects, one of which lies in the fact that the powdered tannic acid when brought in contact with atmospheric air is partially converted into gallic acid, and, of course, such a product has not the same value as the pure tannin. The presence of gallic acid or other foreign substance (the result of oxidation when the tannin extract is dried in too high a temperature) becomes at once apparent when the dried tannin is dissolved, it being impossible to obtain a clear solution. Another defect of this method of preparing tannin lies in the fact that the powdered product is exceedingly hygroscopic, cakes readily, and is then difficult to dissolve. It dissolves very slowly, and even the thoroughly-dry powdered tannin is apt to cake or form lumps, which impedes its solution materially.

The object of my invention is to remedy these defects and produce a practically pure and readily soluble tannin, better adapted for use in the arts and manufactures, and offering to the consumer a certain guarantee of its purity; and to that end the invention consists in the production of tannin in an acicular form by passing the inspissated tannin extract through a finely-perforated sieve, and reeling the thread into bundles, or by allowing it to drop from a height into a chamber, at the bottom of which it is curled into bundles and then broken up.

In practice I have found the apparatus illustrated in the accompanying drawings best suited, though any other description of apparatus adapted to effect the same purposes may be employed.

In the drawings, Figure 1 is a vertical section of the apparatus, and Fig. 2 a bottom-plan view of the reservoir.

In carrying out my process, I take the inspissated viscous solution of tannin, (be this a watery or alcohol or other solution,) obtained in the usual manner, and pour it into a vessel or reservoir, A, located some distance above the ground, lined with copper, zinc, tin, or other suitable material not affected by the tannic acid, and provided with a finely-perforated bottom, *a*, so that the mass will pass through said bottom in thread-like form, and I then reel the threads or otherwise form them in bundles. The more economical and easier way, however, is to allow the fine streams passing through the bottom of the reservoir A to flow from a height into a chamber and cool themselves on the bottom thereof in a dried state; and to that end I employ a tower, B, about five meters in height, with one or more peep-holes, *b*, and a man-hole, *b'*, the purposes of which are obvious.

The reservoir A is surrounded by a jacket, C, into which any heat-producing medium (preferably steam) may be introduced to maintain the extract in the fluid condition required.

The bottom *c* of the jacket has a series of perforations, equal in number to the perforations *a'* in the bottom of the reservoir and coaxial therewith, but of greater diameter. To prevent the contact of the steam with the outflowing extract the perforations are surrounded by small tubes *c'*, secured to the under surface of the bottom of the reservoir and the upper face of the jacket-bottom. The use of these tubes *c'*, surrounding the outflow-apertures, produces another and more important result—namely, the form-drying chambers, wherein the thread as it issues from the reservoir is brought in contact with a heat-radiating surface of great area as compared with the surface of the outflowing thread-like extract, and which dries this thread sufficiently to enable it to support its own weight for a distance of five meters before said thread reaches the bottom of tower, being thoroughly dried by the air within the said tower during its progress to the bottom thereof, where it curls itself like finely-curled wool, and may then be readily broken up into needles.

In practice I prefer to make tower air-tight and produce a vacuum therein by any suitable means, such as a force-pump connected with a pipe, D, located at or near the top of said tower, whereby the pressure of the surrounding atmosphere upon the viscous tannin extract tends to force said extract through the perforations of the bottom of the reservoir. I thus not only greatly accelerate the operation, but I am also enabled to employ a more concentrated solution than would be the case if the passage of the latter depended solely on its weight.

The tannin threads when cold are exceedingly brittle, and break into shining golden-yellow acicular fragments, and in this acicular form the tannin, owing to its brittle or glass-like condition, is not hygroscopic, will not cake, and a perfectly clear solution is obtained therefrom.

The tannin being prepared under the influence of a low temperature does not contain any products resulting from decomposition, such as above enumerated.

Having now described my invention, what I claim is—

As a new article of manufacture and commerce, the herein-described product—namely, tannin or tannic acid in acicular form, substantially as described.

In witness that I claim the foregoing I have hereunto set my hand this 14th day of February, 1880.

JULIUS HOLTZ.

Witnesses:
GEORGE LOUBIN,
BERTHOLD ROI.